Patented Oct. 20, 1953

2,656,326

UNITED STATES PATENT OFFICE 2,656,326

DYEABLE ACRYLONITRILE COPOLYMERS

George E. Ham, Dayton, Ohio, assignor, by mesne assignments, to The Chemstrand Corporation, a corporation of Delaware No Drawing. Application March 23, 1950, Serial No. 151,523

12 Claims. (Cl. 260—29.1)

This invention relates to new dyeable fiber-forming compositions. More specifically, the invention relates to copolymers of acrylonitrile capable of being spun into dyeable textile fibers.

In copending application Serial No. 123,093, filed October 22, 1949, by George E. Ham, of which the present application is a continuation-in-part, there are described and claimed new fiber-forming copolymers of acrylonitrile and methallyl esters of halogen-substituted aliphatic monocarboxylic acids. The application also describes various methods of converting the non-dyeable copolymers into dyeable copolymers by treatment with ammonia and various amines, which after-treatment may be conducted on the solid copolymers, solution of the copolymer or on the fibers fabricated from the copolymers. The after-treatment of the solid copolymer or the fiber are often not effective in inducing sufficient dye affinity for conventional general purpose usage, unless a high proportion of haloacetate groups are present, in which case the incident depreciation in fiber properties makes operations less practicable. The said application also describes reaction of the copolymer with the amines in solution in a suitable solvent, for example N,N-dimethyl-acetamide, gamma-butyrolactone, and mixtures of water and nitromethane, but this procedure is often impracticable or difficult because of the gelation of the solution, which takes place if the solutions are not spun soon after their preparation. Similarly, in the case of temporary shutdowns in the fiber-spinning process unstable polymer solutions may result in serious loss of time and equipment.

The primary purpose of this invention is to provide a method of preparing fibers of improved dye receptivity. A further purpose is to provide a method of spinning involving solutions of polymers not susceptible to gelation. A still further purpose of this invention is to provide a method of converting non-dyeable copolymers of acrylonitrile and methallyl chloroacetate into dyeable copolymers by a convenient practicable procedure.

In accordance with this invention it has been found that when copolymers of methallyl halo-acetates and acrylonitrile are treated with either trimethylamine or triethylamine in a solution, the copolymer is rendered dyeable by conversion of the chloroacetate groups into quaternary ammonium radicals without experiencing the usual increase in viscosity or gelation. This reaction appears to be specific with trimethyl- and triethylamine, since almost invariably the use of other amines induces an increased viscosity or gelation. The treatment of methallyl chloroacetate copolymers in accordance with this procedure is quite different in result than that obtained by the similar treatment of the allyl chloroacetate copolymer. When a solution of a copolymer of allyl chloroacetate and acrylonitrile is treated in dimethylacetamide or other solvent, solution with trimethylamine, almost immediate gelation occurs. The treatment of copolymers of acrylonitrile and methallyl chloroacetate in accordance with this invention induces dyeability without any sign of gelation. In fact the treatment may in some cases make the methallyl chloroacetate copolymer solutions more stable than copolymer solutions untreated with the trimethyl- or triethylamine.

This invention is practicable with fiber-spinning copolymers of 75 to 99.5 percent acrylonitrile and from 0.5 to 25 percent of methallyl haloacetate. Since the copolymers of more than 98 percent acrylonitrile and less than two percent of the methallyl esters do not contain sufficient reactive groups to produce copolymers of optimum dye receptivity, and since copolymers having less than 85 percent acrylonitrile often do not posses the optimum fiber properties, the preferred class of copolymers are those of 85 to 98 percent acrylonitrile and from two to 15 percent of the methallyl esters of haloacetic acids.

The copolymers used in the practice of this invention may be prepared by any polymerization procedure but preferred practice utilizes a suspension polymerization in which the reactant monomers are heated in the presence of a suitable free radical catalyst in an aqueous medium. Usually the reaction requires a dispersant to prevent the agglomeration of the copolymer during its formative stage. The polymerization reaction may be a batch procedure or it may be continuous. A very desirable procedure is the semi-continuous type in which the monomers are gradually added to an aqueous medium in a reactor and the polymer produced is recovered after a pre-determined quantity of monomers has been reacted. Conventional procedures with respect to the use of regulators, continuous or intermittent addition of catalyst and dispersing agent, low-temperature redox methods and other known procedures for producing uniform copolymers of desired molecular weights are also feasible.

The copolymers preferred in the practice of this invention are those of uniform physical and chemical properties and preferably of higher molecular weight. The copolymers will have molecular weights in excess of 10,000 and preferably between 25,000 and 150,000.

The copolymers are rendered dyeable by reaction with either trimethylamine or triethylamine while dissolved in a suitable solvent. Suitable solvents for the conduct of the reaction may be any of the conventional acrylonitrile solvents, some of which are well known to the art and widely described in published literature. Examples of suitable solvents are: N,N-dimethylacetamide, N,N-dimethylformamide, tris(N,N-dimethylamino)-phosphine oxide, butyrolactone, maleic anhydride, α-cyanoacetamide, N,N-dimethylmethoxyacetamide, a mixture of water and nitromethane, and other substances known to dissolve high acrylonitrile copolymers.

The reaction is conducted by dissolving or dispersing finely divided polymers in sufficient solvent to produce a solution of from ten to 25 percent of the copolymer. The liquid triethylamine or the gaseous trimethylamine, may be mixed directly with the polymer solution, or preferably, may be dissolved in a small proportion of the same or other acrylonitrile solvent and the two liquids blended by conventional mixing procedures. A convenient method of conducting the reaction involves the dispersion of the finely divided copolymer at a temperature below that at which solutions are readily formed and thereafter adding and mixing therewith the triethyl- or trimethylamine, or a solution of the said trialkylamine before a viscous polymer solution has been prepared. After a thorough mixing of the reagents, the reaction mixture may then be heated to a temperature at which the viscous copolymer solution is readily formed. The higher final temperature also serves to complete the quaternization reaction between the chloroacetate groups and the trialkylamines, and thereby develop the optimum dyeing properties.

The quaternization reaction between the methallyl chloroacetate and trimethylamine is believed to involve the reaction represented by the equation:

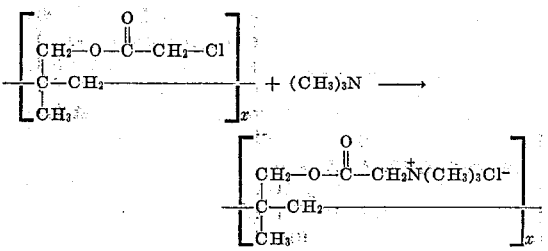

wherein $x$ is a number indicative of the degree of polymerization.

The solutions of the copolymers which have been quaternized by reaction of the trimethyl- or triethylamine will be found to be both dye receptive and stable to gelation over long periods of time. The solutions prepared in accordance with this invention may in some instances be more stable to gelation than solutions of the same copolymer which have not been treated with triethyl- or trimethylamine.

The stable solutions of dyeable copolymers may be spun into useful and valuable fibers by conventional spinning procedures. The solutions may be extruded through dies and spinerets containing a plurality of apertures into a medium which extracts the solvent and precipitates the solid polymer in a continuous fibrous form. Both the dry spinning method, in which the said medium is a gas, and the wet spinning method, in which the medium is a liquid, are practicable. Fibers produced therefrom may be stretched and shrunk to develop fiber properties and may be dyed with conventional acid dyestuffs to form a wide variety of colored fibers. Of particular utility are those dyestuffs which contain sulfonate groups. The spinning and dyeing procedures used are conventional and well known in the art, and are not regarded as part of this invention.

Further details of this invention are set forth with respect to the following examples.

Example 1

A copolymer of 95.5 percent acrylonitrile and 4.5 percent of methallyl chloroacetate was prepared by adding the premixed monomers to an aqueous medium over a two hour period at 80° C. The reaction was catalyzed with 0.3 percent of potassium persulfate based on the weight of the monomers and was conducted in the presence of 0.6 percent of tertiary dodecyl mercaptan as a regulator. The dispersion of the reactants was maintained by the use of 0.1 percent of sodium salt of mixed mahogany acids. After all the monomers had been added the reaction was continued for one-half hour at the reflux temperature, and then steam distilled to remove unreacted monomers. The resulting copolymer was found to have a specific viscosity of 0.20 in 0.1 percent solutions of the copolymer in N,N-dimethylacetamide.

A mixture of 900 grams of the acrylonitrile copolymer and 3886 grams of N,N-dimethylacetamide were mixed at 30° C. to form a suspension of solid polymer in the solvent. The suspension was then mixed with a solution of 18 grams of trimethylamine in 196 grams of N,N-dimethylacetamide at 30° C. for ten minutes, at which time the entire mixture was heated to 85° C. and maintained there until the resin was completely dissolved. The treated solution was stored for one hundred hours with no visible signs of gelation or measurable increase in viscosity.

The treated solutions were spun into fibers by extruding through a spinneret having 30 apertures, each 0.005 inch in diameter, into a mixture of 60 percent by weight of dimethylacetamide and 40 percent water. The fiber so produced was stretched 200 percent and dyed with standard dyeing procedure. The fibers were effectively dyed with Wool Fast Scarlet, Alizarin Light Blue, Acid Green CC and Wool Fast Yellow.

Example 2

A solution of the copolymer described in Example 1 was prepared using N,N-dimethylacetamide, by mixing the polymer and solvent at 30° C. The suspension was then converted into a solution by increasing the temperature to 85° C. The solution was then cooled to 30° C. and a separately prepared solution of 8.5 percent trimethylamine in N,N-dimethylacetamide was added thereto in approximately stoichiometric proportions. The treated solution was then heated to 50° C. in which condition it was stored for over one hundred hours. No gelation and no measurable increase in viscosity occurred after the trimethylamine was added.

Example 3

The procedure of Example 1 was repeated, using allyl chloroacetate in place of methallyl chloroacetate. The solution became gelled within a short time after the trimethylamine was added and the gelation took place more rapidly than a similar solution which had not been treated with trimethylamine.

*Example 4*

A copolymer of 93.3 percent by weight of acrylonitrile and 6.7 percent of methallyl chloroacetate was prepared as in Example 1. The specific viscosity in 0.1 percent of N,N-dimethylformamide was found to be 0.16.

The polymer was dissolved in N,N-dimethylacetamide to produce a 19 percent solution. A stoichiometric quantity of a ten percent solution of trimethylamine in N,N-dimethylacetamide was mixed therewith. The mixture was heated at 45° C. for 35 minutes without gelation or increase in viscosity. The polymer solution was then spun into fibers by extrusion through a thirty-hole spinneret into a mixture of 60 percent dimethylacetamide and 40 percent water. The fibers were then stretched 200 percent and dyed with a Wool Fast Scarlet dye bath containing 0.02 grams of dye and 5.0 grams of three percent sulfuric acid for each gram of fiber. The dye bath was exhausted in one hour at 100° C. The dyed fiber was fast to laundering and dry cleaning.

The invention is defined by the following claims:

1. A method of preparing dyeable acrylonitrile copolymers, which comprises heating a copolymer of 75 to 99.5 percent of acrylonitrile and 0.5 to 25 percent of methallyl haloacetate, with a compound selected from the group consisting of triethylamine and trimethylamine.

2. A method of preparing dyeable acrylonitrile copolymers, which comprises heating in solution a copolymer of 80 to 98 percent of acrylonitrile and two to 20 percent of methallyl haloacetate, with a compound selected from the group consisting of triethylamine and trimethylamine.

3. The method described in claim 1, wherein the halogen is selected from the group consisting of chlorine and bromine.

4. The method described in claim 2, wherein the halogen is selected from the group consisting of chlorine and bromine.

5. The method of preparing a dyeable copolymer, which comprises heating a copolymer of 80 to 98 percent of acrylonitrile and two to 20 percent of methallyl chloroacetate with trimethylamine.

6. The method of preparing a dyeable copolymer, which comprises heating a copolymer of 80 to 98 percent of acrylonitrile and two to 20 percent of methallyl chloroacetate with triethylamine.

7. A method of preparing dyeable acrylonitrile copolymers, which comprises mixing a copolymer of 75 to 99.5% of acrylonitrile and 0.5 to 25% of methallyl haloacetate in a solvent therefor, and quaternizing the copolymer by adding a compound selected from the group consisting of trimethylamine and triethylamine and heating the mixture.

8. The method described in claim 7 wherein the halogen is selected from the group consisting of chlorine and bromine.

9. A method of preparing dyeable acrylonitrile copolymers, which comprises mixing a copolymer of 80 to 98% of acrylonitrile and two to 20% of methallyl haloacetate in a solvent therefor, heating the mixture to dissolve the copolymer, and quaternizing the copolymer by adding to the solution a compound selected from the group consisting of trimethylamine and triethylamine while heating the solution.

10. The method described in claim 9, wherein the halogen is selected from the group consisting of chlorine and bromine.

11. The method described in claim 9 wherein the haloacetate is methallyl chloroacetate and the quaternizing compound is trimethylamine.

12. The method described in claim 9 wherein the haloacetate is methallyl chloroacetate and the quaternizing compound is triethylamine.

GEORGE E. HAM.

References Cited in the file of this patent

UNITED STATES PATENTS

| Number | Name | Date |
|---|---|---|
| 2,572,561 | Ham | Oct. 23, 1951 |

FOREIGN PATENTS

| Number | Country | Date |
|---|---|---|
| 573,055 | Great Britain | Nov. 5, 1945 |